US012594978B1

(12) United States Patent
Zhang

(10) Patent No.: US 12,594,978 B1
(45) Date of Patent: Apr. 7, 2026

(54) EXPANDABLE PLATFORM CART

(71) Applicant: SANNWSG INC, Dover, DE (US)

(72) Inventor: Qingyun Zhang, Dover, DE (US)

(73) Assignee: SANNWSG INC, Dover, DE (US)

( * ) Notice: Subject to any disclaimer, the term of this patent is extended or adjusted under 35 U.S.C. 154(b) by 0 days.

(21) Appl. No.: 19/259,202

(22) Filed: Jul. 3, 2025

(51) Int. Cl.
B62B 3/00 (2006.01)
B62B 3/02 (2006.01)
B62B 5/06 (2006.01)

(52) U.S. Cl.
CPC .............. B62B 3/007 (2013.01); B62B 3/025 (2013.01); B62B 5/064 (2013.01); *B62B 2205/06* (2013.01); *B62B 2205/33* (2013.01)

(58) Field of Classification Search
CPC ......... B62B 3/007; B62B 3/036; B62B 3/004; B62B 3/02; B62B 3/1484; B60R 3/02; B60R 3/007
See application file for complete search history.

(56) References Cited

U.S. PATENT DOCUMENTS

| | | | | | |
|---|---|---|---|---|---|
| 1,039,986 | A | * | 10/1912 | Merritt .................. | A47C 17/48 |
| | | | | | 5/314.1 |
| 9,738,298 | B1 | * | 8/2017 | Yang ....................... | B62B 3/025 |
| 10,099,711 | B1 | * | 10/2018 | Sun ......................... | B62B 3/007 |
| 11,685,416 | B2 | * | 6/2023 | Yang ...................... | B62B 3/025 |
| | | | | | 280/651 |
| 12,304,544 | B2 | * | 5/2025 | Conn ...................... | B62B 5/067 |
| 2025/0083724 | A1 | * | 3/2025 | Sun ......................... | B62B 5/065 |

FOREIGN PATENT DOCUMENTS

CN          221273073 U          7/2024

* cited by examiner

*Primary Examiner* — Steve Clemmons
(74) *Attorney, Agent, or Firm* — Hawaii Patent Services; Nathaniel K. Fedde; Kenton N. Fedde

(57) ABSTRACT

The present disclosure relates to an expandable platform cart, the core of which comprises a frame, a double-tier load-bearing platform, and an extension system. The double-tier platform supports categorized storage: the lower tier holds heavy items to lower the center of gravity, while the upper tier stores lightweight items; an X-shaped telescopic frame features a linked folding mechanism, allowing volume reduction for transport in a single step. An extension plate achieves rotational storage through oblong holes and a connecting shaft, working in tandem with the tension assembly to automatically tension and support the unfolded state.

11 Claims, 14 Drawing Sheets

130

100

200    A    120

140        141        142

200

100

600                                          100

300                                          700

EXPANDABLE PLATFORM CART

TECHNICAL FIELD

The present disclosure relates to the technical field of carts, particularly to an expandable platform cart.

BACKGROUND

Carts, as convenient tools for transporting outdoor equipment, are widely popular among camping enthusiasts and household users due to their lightweight and foldable storage features. To increase loading area or provide additional functional platforms (such as temporary tabletops), many carts are designed with expandable structures, typically using foldable or detachable extension plates.

Currently, there are various methods for connecting the extension plate to the cart body and switching its state. A common approach involves hinging the extension plate to the cart body using simple pivot structures (such as hinges or pivot pins). While this method is relatively simple in structure. In the stored state, the extension plate usually relies solely on gravity or simple limiters to maintain its position, lacking a reliable self-locking or locking mechanism. This may cause the extension plate to accidentally unfold or wobble during transport or storage, especially when encountering bumps, affecting the overall compactness and stability of the cart, and may even lead to component damage or inconvenience in use.

SUMMARY

The present disclosure provides an expandable platform cart to address the issues raised in the background art.

To achieve the above object, the present disclosure adopts the following technical solutions:

An expandable platform cart comprises a cart body; an extension plate, which has a connecting end and an extension end, the connecting end being movably connected to the cart body, allowing the extension plate to move between an unfolded position and a stored position; a support assembly, connected between the extension end and the cart body. When the extension plate moves to the unfolded position, the support assembly automatically provides anti-gravity support to the extension end; and when the extension plate moves to the stored position, the support assembly remains connected to the extension plate and forms an integrated storage structure with the cart body.

The present disclosure provides another technical solution: an expandable platform cart, comprising: a cart body; an extension plate, which has a connecting end and an extension end, the connecting end being rotatably connected to the cart body, allowing the extension plate to move between an unfolded position and a stored position; a support assembly, connected between the extension end and the cart body. When the extension plate moves to the unfolded position, the support assembly automatically provides anti-gravity support to the extension end; and when the extension plate moves to the stored position, the support assembly remains connected to the extension plate and forms an integrated storage structure with the cart body.

The beneficial effects of the present disclosure compared to the prior art are as follows: by using a tension assembly to bear the gravity of the extension plate when unfolded, the tension assembly can be directly extended for use or stored without disassembly, making it simple, easy to use, and convenient to set up; furthermore, through the arrangement of the oblong hole, the connecting end of the extension plate, and the mounting base, the extension plate can be maintained in the stored state without disassembly, simplifying the structural setup and enhancing user convenience.

BRIEF DESCRIPTION OF DRAWINGS

The drawings, which form part of this application, are provided to further illustrate the present disclosure. The illustrative embodiments and descriptions thereof are intended to explain the present disclosure and do not constitute an undue limitation thereof. In the drawings.

Figure 1:
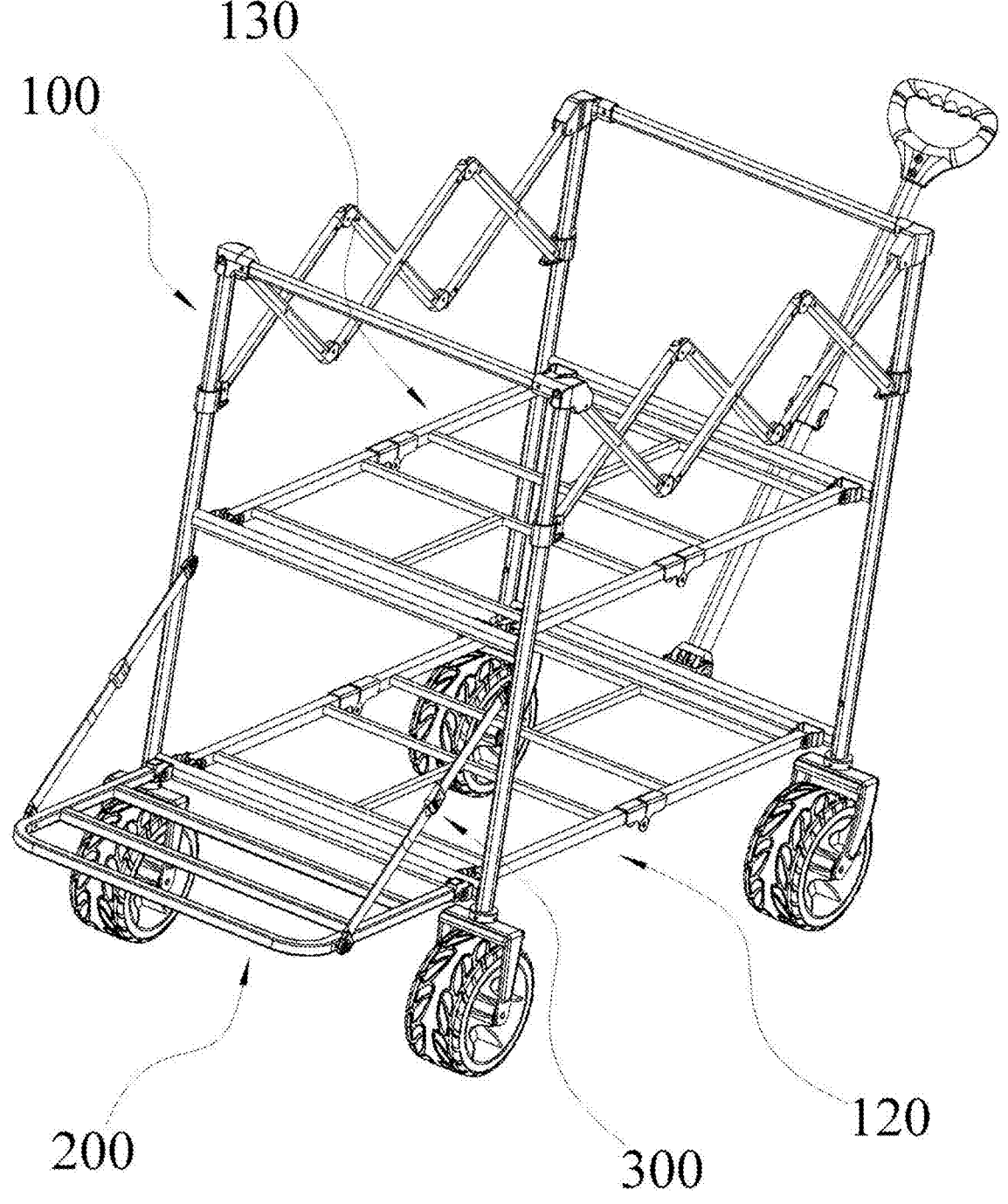
FIG. 1 is a schematic structural diagram of an embodiment provided by the present disclosure.

Reference signs: Cart body (100); Cart frame (110); Vertical rod (111); Horizontal rod (112); Caster (113); Fixing sleeve (114); Support rod (115); Mounting base (116); Mounting slot (1161); Connecting hole (1162); First load-bearing platform (120); Fixing rod (121); I-shaped rod (122); Second load-bearing platform (130); X-shaped telescopic frame (140); Hinge sleeve (141); Bearing rod (142); Pull rod (150); Third through-hole (160); Extension plate (200); Connecting end (210); Oblong hole (211); Extension end (220); Second through-hole (221); Tension assembly (300); Connector (310); First through-hole (311); Tensioning strap (320); Connecting shaft (400); Fastener (500); First storage pouch (600); Second storage pouch (700); Safety belt (800); First end of the oblong hole (a); Second end of the oblong hole (b).

DESCRIPTION OF EMBODIMENTS

The technical solution in the embodiment of the present disclosure will be clearly and completely described below with reference to the drawings. Obviously, the described embodiment is part of, rather than all of the embodiments of the present disclosure. The following description of at least one exemplary embodiment is illustrative in nature and is in no way intended to limit the present disclosure, its application or uses. Based on the embodiments in the present disclosure, all other embodiments obtained by those skilled in the art without creative work belong to the scope of protection of the present disclosure.

It should be noted that the terminology used here is only for describing specific embodiments, and is not intended to limit exemplary embodiments according to the present application. As used herein, the singular form is also intended to include the plural form unless the context clearly indicates otherwise. Furthermore, it should be appreciated that when the terms "comprising" and/or "including" are used in this specification, they specify the presence of features, steps, operations, devices, components and/or combinations thereof.

Unless otherwise specified, the relative arrangement of components and steps, numerical expressions and numerical values set forth in these embodiments do not limit the scope of the present disclosure. At the same time, it should be appreciated that for the convenience of description, the dimensions of various parts shown in the drawings are not drawn according to the actual scale relationship. Techniques, methods and equipment known to those skilled in the art may not be discussed in detail, but in appropriate cases, they should be regarded as part of the authorization specification. In all the examples shown and discussed herein, any specific values should be interpreted as illustrative, and not as limiting. Therefore, other examples of exemplary embodiments may have different values. It should be noted that similar numbers and letters indicate similar items in the following drawings, therefore once an item is defined in one drawing, it does not need to be further discussed in subsequent drawings.

An expandable platform cart includes a cart body 100, an extension plate 200, and a tension assembly 300 (refer to FIG. 1).

Figure 7:
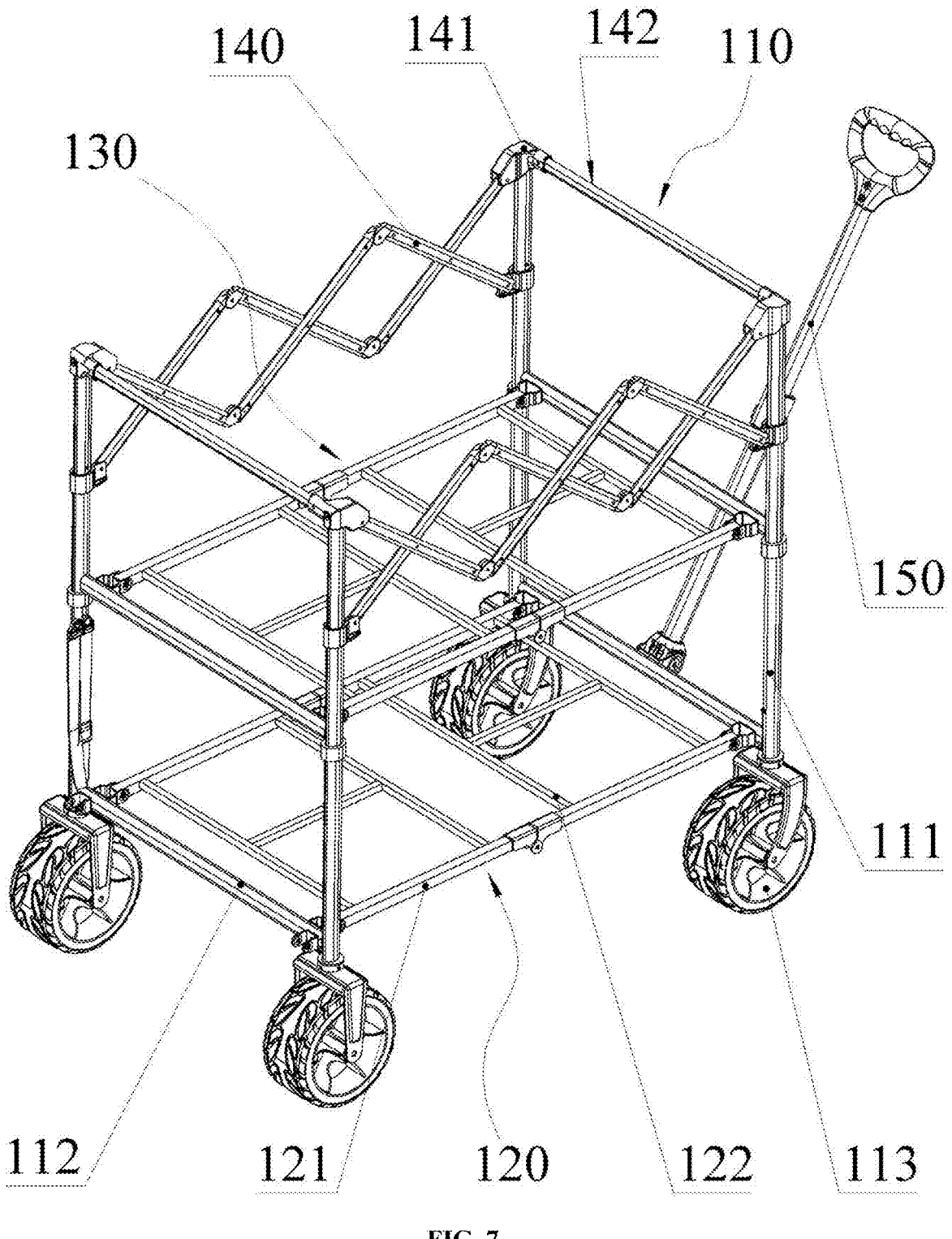
FIG. 7 is a schematic structural diagram of the cart frame in the embodiment shown in FIG. 2.

In this embodiment, referring to FIGS. 1 and 7, the cart body 100 includes two cart frames 110, which are connected by a first load-bearing platform 120. The first load-bearing platform 120 facilitates the placement of various objects by the user.

In other embodiments, referring to FIG. 7, a second load-bearing platform 130 is arranged between the two cart frames 110, positioned above the first load-bearing platform 120 and sharing the same structure as the first load-bearing platform 120; stacking platforms upward under the same horizontal footprint effectively increases usable carrying area. This is particularly suitable for storing small, scattered, or categorized items (such as tools, parts, file boxes, etc.), avoiding the clutter and difficulty in retrieval caused by piling all items on a single layer. Meanwhile, the first load-bearing platform 120 holds heavier, bulkier, or less frequently used items. Placing heavier items on the first load-bearing platform 120 helps lower the cart body's overall center of gravity, enhancing stability during movement or when stationary, and reducing the risk of tipping. The second load-bearing platform 130 accommodates lighter, frequently used, or quickly accessible items.

In other embodiments, referring to FIG. 7, the cart frame 110 includes two vertical rods 111, with a horizontal rod 112 fixed between them, and both vertical rods 111 are equipped with casters 113.

In other embodiments (not shown), the casters 113 are fitted with a locking structure, allowing users to lock the casters 113 through this locking structure.

In other embodiments (not shown), the standard casters 113 are replaced with larger-diameter, wider-tread, deep-tread pneumatic tires (or solid foam wide tires), which significantly improves passability and stability on soft or uneven surfaces like sand, mud, or gravel roads. Additionally, a simple spring or elastic rubber block shock absorption structure is added between the vertical rods 111 and the axles to mitigate bumps.

In other embodiments (not shown), the other two casters 113 are configured as directional wheels, and hub motors are integrated within the directional wheels. Simultaneously, a detachable battery compartment is installed at the bottom of the cart body 100 or on the vertical rods 111 to house a lithium battery pack, supplying power to the motors. This motorized assistance greatly reduces the burden of long-distance or heavy-load pushing for users, especially benefiting the elderly or those with limited physical strength.

In other embodiments (not shown), the two vertical rods 111 and the horizontal rod 112 can be connected in a detachable manner, and the two vertical rods 111 and the casters 113 can also be connected detachably. When these components are detachable, long rods (especially the horizontal rods) can be packaged separately or placed parallel, significantly reducing the overall packaging size. This is highly beneficial for transportation (particularly long-distance shipping or air freight) and warehouse storage, as it notably saves space and logistics costs. Additionally, the product can be transported as loose parts to the destination (e.g., customer sites or distributors) and assembled later, reducing transportation difficulty and the need for large installation entrances.

In other embodiments, referring to FIG. 7, the first load-bearing platform 120 includes two hinged fixing rods 121, both of which are hinged to the corresponding horizontal rod 112. An X-shaped telescopic frame 140 is hinged between the two opposing horizontal rods 112, and the X-shaped telescopic frame 140 lies in the same vertical plane as the two fixing rods 121. When the user pushes the two vertical rods 111, the X-shaped telescopic frame 140 is compressed, forcing the angle of the X-shaped telescopic frame 140 to decrease, thereby achieving folding and shortening. Simultaneously, as the X-type telescopic frame 140 extends or retracts and the horizontal rod 112 moves, the hinge point of the two fixing rods 121 is driven upward, causing the two fixing rods 121 to be folded. This allows the cart body 100 to be folded, reducing its size post-folding for easy placement in car trunks, narrow storage spaces, shelf gaps, or dense stacking during transport. Moreover, when folding the cart body 100, the user only needs to push the vertical rod 111 to trigger the entire linked folding process, eliminating complex steps or disassembling multiple parts. The operation is intuitive, quick, and labor-saving.

Figure 4:
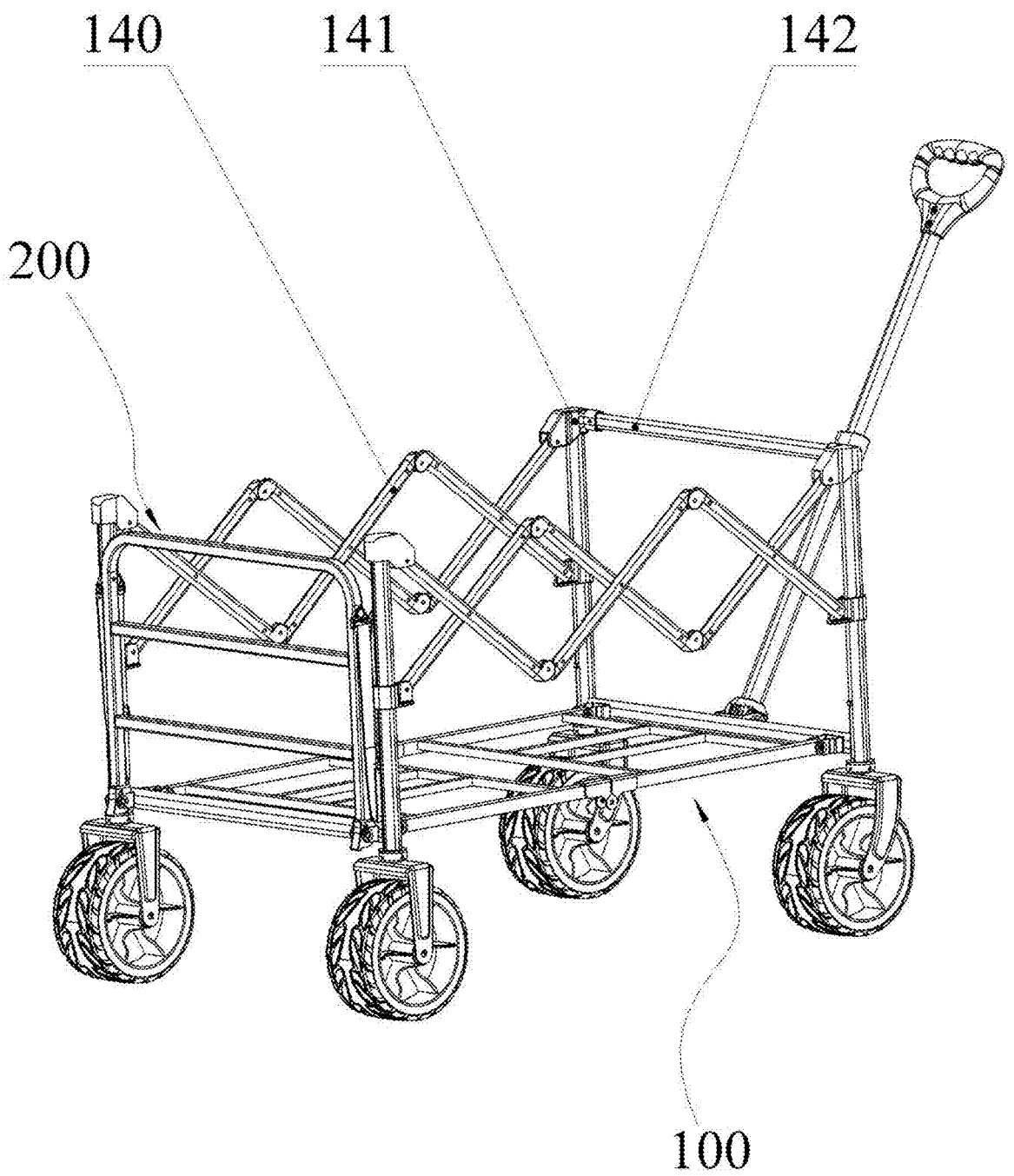
FIG. 4 is a schematic structural diagram of the single-tier cart in the embodiment shown in FIG. 3.

In other embodiments, referring to FIGS. 4 and 7, both ends of the X-shaped telescopic frame 140 are hinged with hinge sleeves 141, which can be detachably mounted on the vertical rod 111 through bolts or snap-fit mechanisms. When the X-shaped telescopic frame 140 is made detachable, users can replace it with X-shaped telescopic frames of different lengths or strengths to adapt to varying load-bearing requirements.

In other embodiments, referring to FIG. 7, a bearing rod 142 is inserted between the hinge sleeves 141 on the same side at the top of the two X-shaped telescopic frames 140, thereby enhancing the overall strength between the two X-shaped telescopic frames 140.

In other embodiments (not shown), the main load-bearing components such as the cart frame 110 (vertical rod 111, horizontal rod 112), the support rod 115, the X-shaped telescopic frame 140, and load-bearing platform skeleton are made of high-strength carbon fiber composite materials or aerospace-grade aluminum alloy tubing, significantly reducing weight.

In other embodiments, referring to FIG. 7, an I-shaped rod 122 is fixed between two adjacent fixing rods 121. By incorporating the I-shaped rod 122, the support strength of the first load-bearing platform 120 is enhanced.

In other embodiments (not shown), the I-shaped rod 122 can be detachably installed on the fixing rod 121 through bolts or snap-fit mechanisms, allowing users to replace the I-shaped rod 122 as needed.

Figure 2:
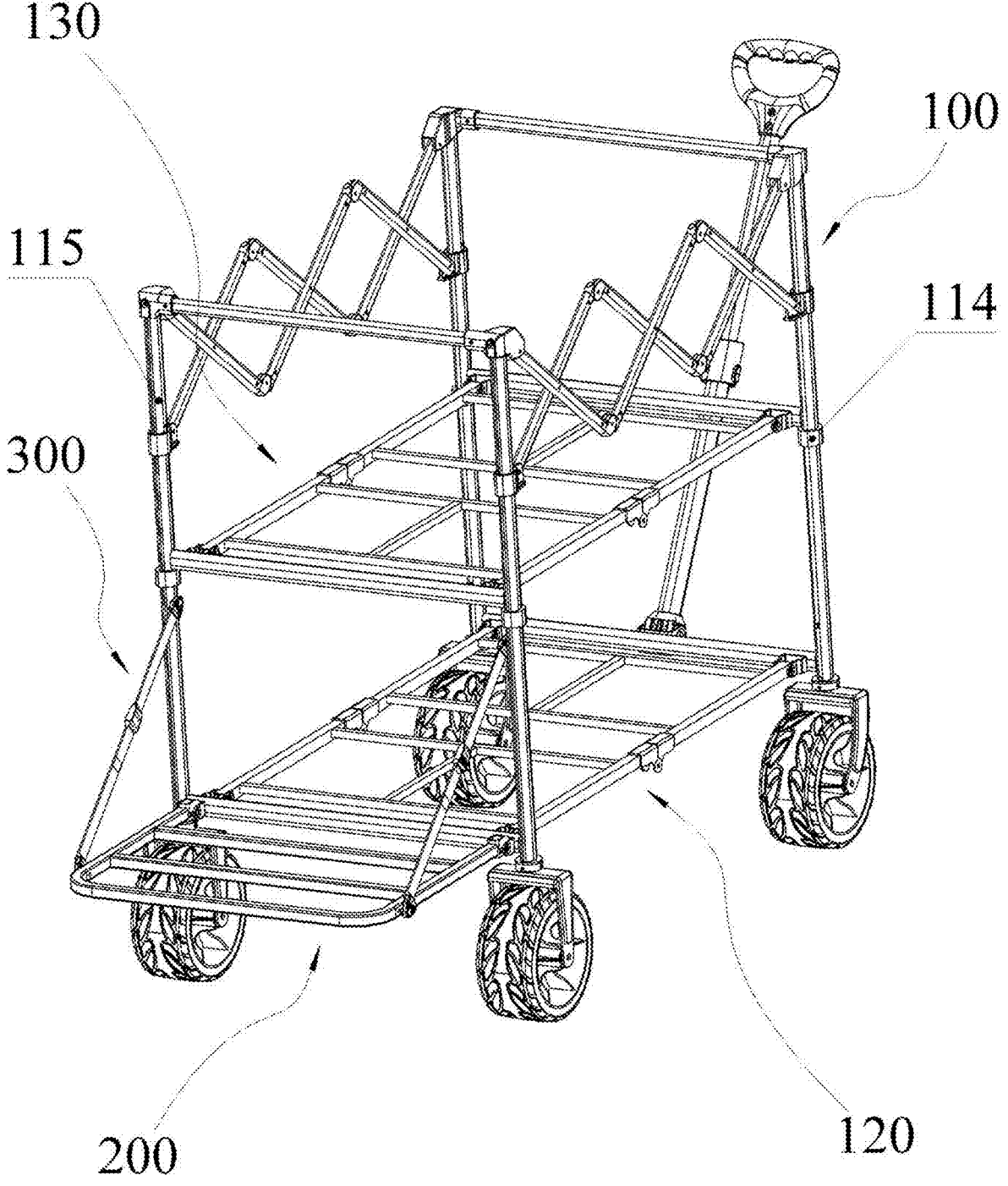
FIG. 2 is a schematic structural diagram of another embodiment provided by the present disclosure.

In this embodiment, referring to FIG. 2, a fixing sleeve 114 is movably sleeved over the top of the vertical rod 111, and a support rod 115 is movably sleeved at the other end of the fixing sleeve 114. Both the X-shaped telescopic frame 140 and the second load-bearing platform 130 are mounted on the support rod 115, configuring the cart body 100 as a double-tier cart. Referring to FIG. 4, by removing the fixing sleeve 114 and support rod 115 and sleeving the X-shaped telescopic frame 140 onto the vertical rod 111 through a hinge sleeve 141, the cart body 100 is configured as a single-tier cart. This structure allows users to freely switch between single-tier and double-tier carts based on needs, improving product adaptability.

In other embodiments (not shown), a slider is fixed on the inner wall of the fixing sleeve 114, while the vertical rod 111 and support rod 115 have grooves matching the slider at their contact ends with the fixing sleeve 114. The movement of the slider is guided by the grooves, improving blind insertion success during assembly of the vertical rod 111, the fixing sleeve 114, and the support rod 115, eliminating the need for repeated attempts.

In other embodiments (not shown), an electromagnetic adsorption device can be installed on the inner wall of the fixing sleeve 114. When the vertical rod 111 and support rod 115 are inserted, the electromagnetic adsorption device adsorbs the vertical rod 111 and the support rod 115, enhancing the connection stability of the vertical rod 111 and the support rod 115.

In other embodiments (not shown), both the first load-bearing platform 120 and the second load-bearing platform 130 are designed as standardized plug-and-play modules. The edge of the platform is provided with quick-lock interfaces (e.g., male-female clips or magnetic +mechanical locks), and the bottom of the platform is pre-equipped with universal connectors for the hinge sleeve 141 or bearing rod 142. Different functional modules (e.g., insulated racks or tool holders) can be mounted on the first load-bearing platform 120 or the second load-bearing platform 130, enabling users to freely combine and stack platforms based on travel needs.

In this embodiment, please refer to FIG. 7, where one side of a horizontal rod 112 is hinged with a pull rod 150 through a hinge bracket. The pull rod 150 is internally equipped with a locking mechanism. When the user adjusts the pull rod 150 to the desired angle, the locking mechanism can be operated to lock the current angular position of the pull rod, preventing accidental swinging or resetting.

In other embodiments (not shown), the hinged end of the pull rod 150 is equipped with a hinge bushing, which contains a stacked disc spring assembly. By screwing the end cap, the springs are compressed to generate radial pressure, enabling the pull rod 150 to be fixed in place.

Figure 3:
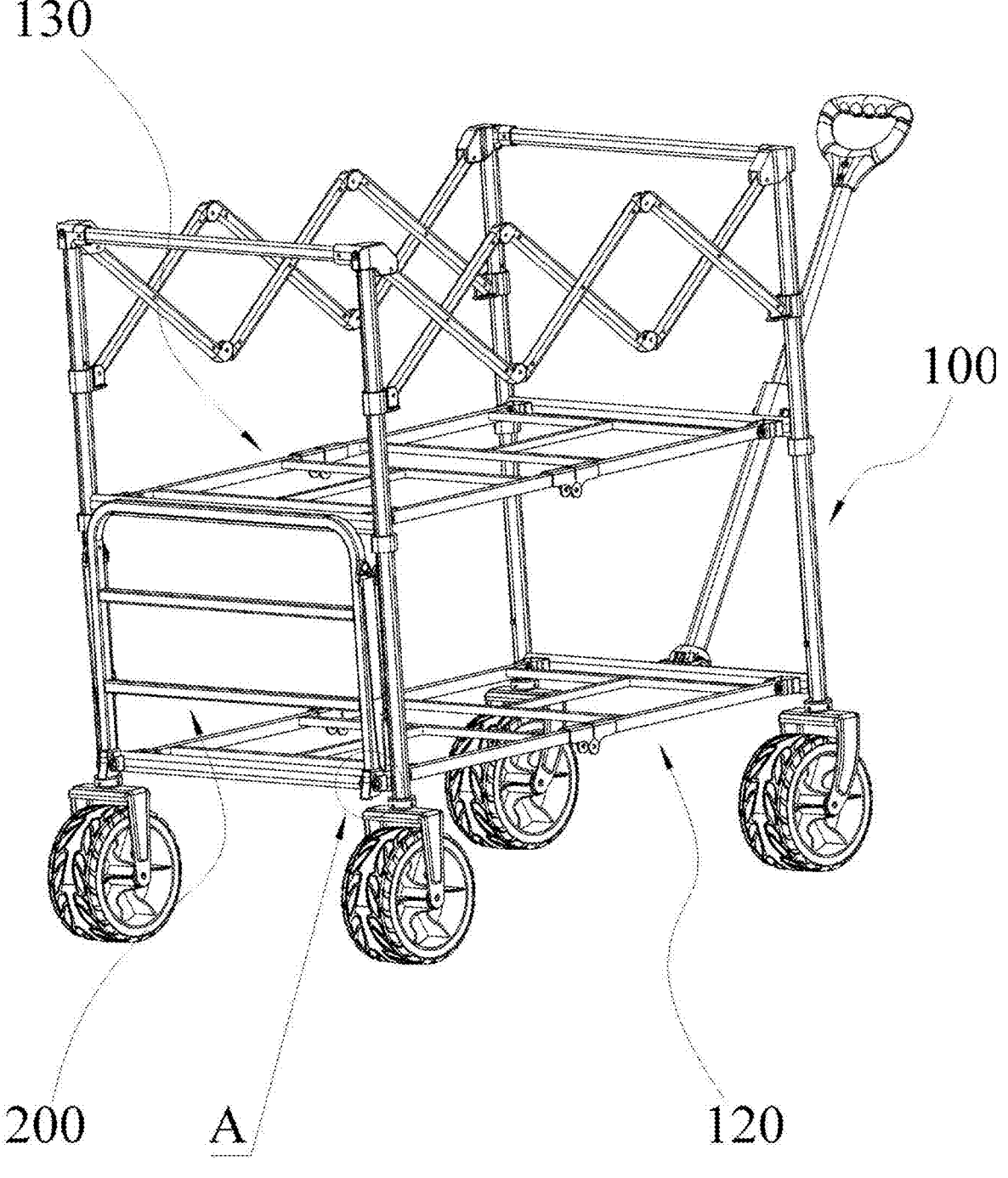
FIG. 3 is a schematic structural diagram of the embodiment shown in FIG. 2 when the extension plate is stowed.
Figure 8:
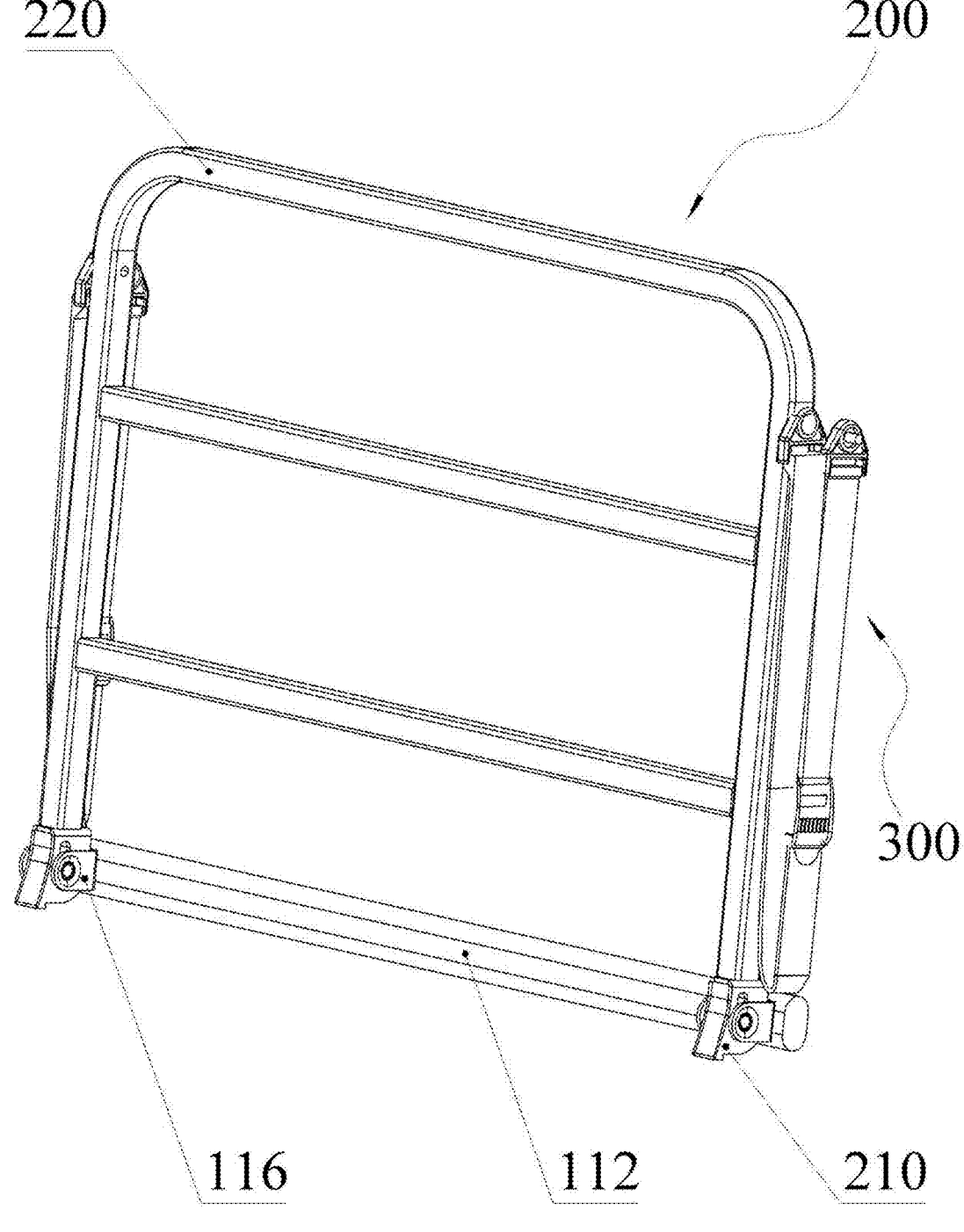
FIG. 8 is a schematic structural diagram of the extension plate in the embodiment shown in FIG. 3.
Figure 10:
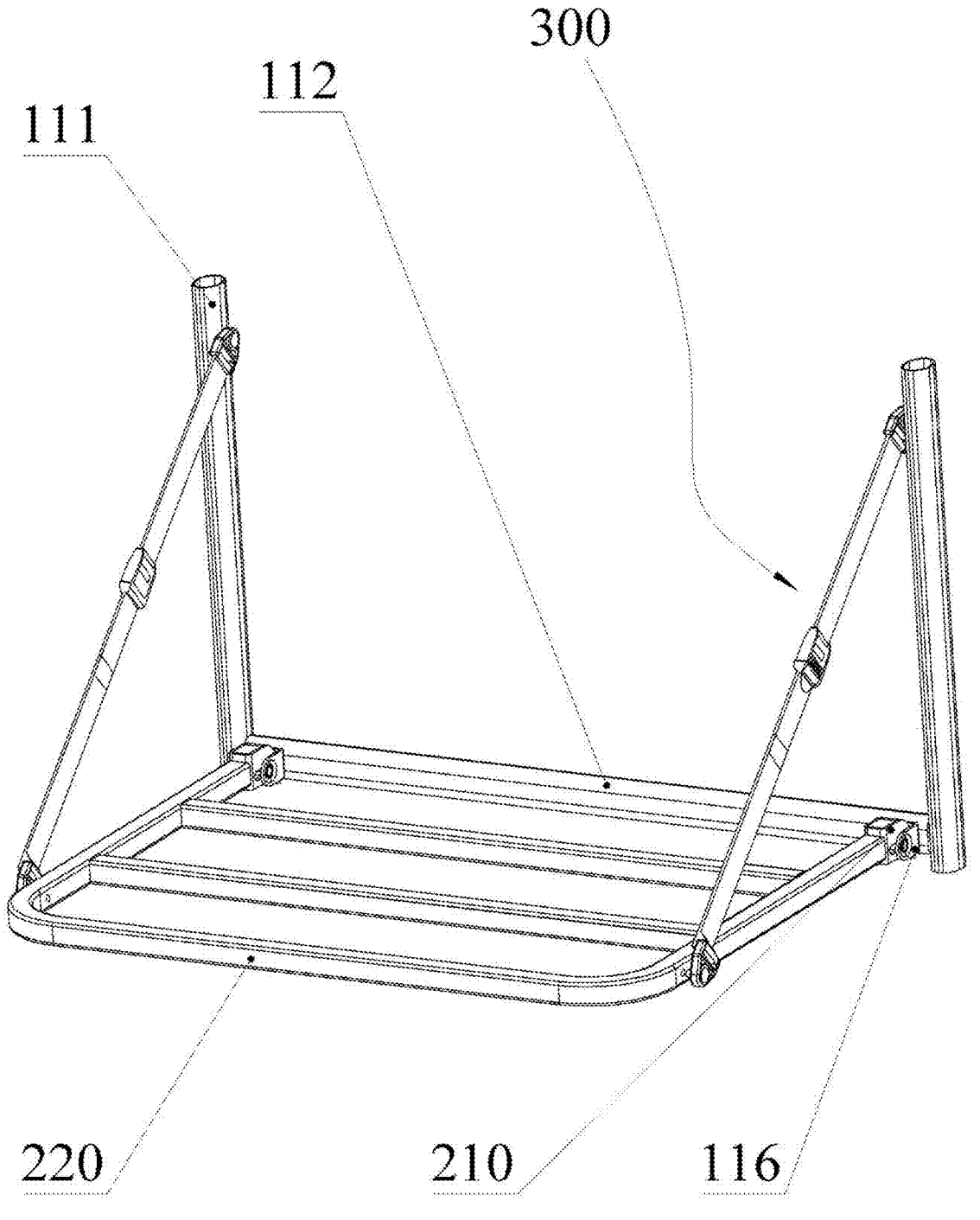
FIG. 10 is a schematic diagram of the connection between the extension plate, cart frame, and tension assembly in the embodiment shown in FIG. 2.

In this embodiment, referring to FIGS. 2 and 3, the extension plate 200 is mounted on the cart frame 110 away from the pull rod 150. As shown in FIGS. 8 and 10, the extension plate 200 includes a connecting end 210 and an extension end 220. The connecting end 210 of the extension plate 200 is connected to the horizontal rod 112, and the extension plate 200 can be unfolded away from the cart body 100. The first end of the tension assembly 300 is connected to the extension end 220 of the extension plate 200, while the second end of the tension assembly 300 is connected to the vertical rod 111. The installation point of the second end of the tension assembly 300 on the vertical rod 111 is higher than the connection point between the extension plate 200 and the horizontal rod 112. When the extension plate 200 is unfolded, the extension plate 200 can be prevented from sliding outward when the tension assembly 300 lies in the horizontal plane, while the gravity-induced sinking force of the extension end 220 can be counteracted when the tension assembly 300 lies in the vertical plane, so that the tension assembly 300 can tension the extension end 220 of the extension plate 200. The weight of the extension plate 200 during unfolding can be borne by using the tension assembly 300; meanwhile, when using the tension assembly 300, users can directly extend, retract, and store the extension plate 200 without disassembly, making it simple, practical, and easy to set up.

In other embodiments, referring to FIGS. 8 and 10, the connecting end 210 of the extension plate 200 is hinged to the horizontal rod 112, allowing the plate to be rotatably connected on the cart body 100. When the extension plate 200 is in the stored state, the extension end 220 of the extension plate 200 remains close to the upper part of the cart body 100, ensuring minimal space occupancy when the extension plate 200 is in the stored state.

Figure 9:
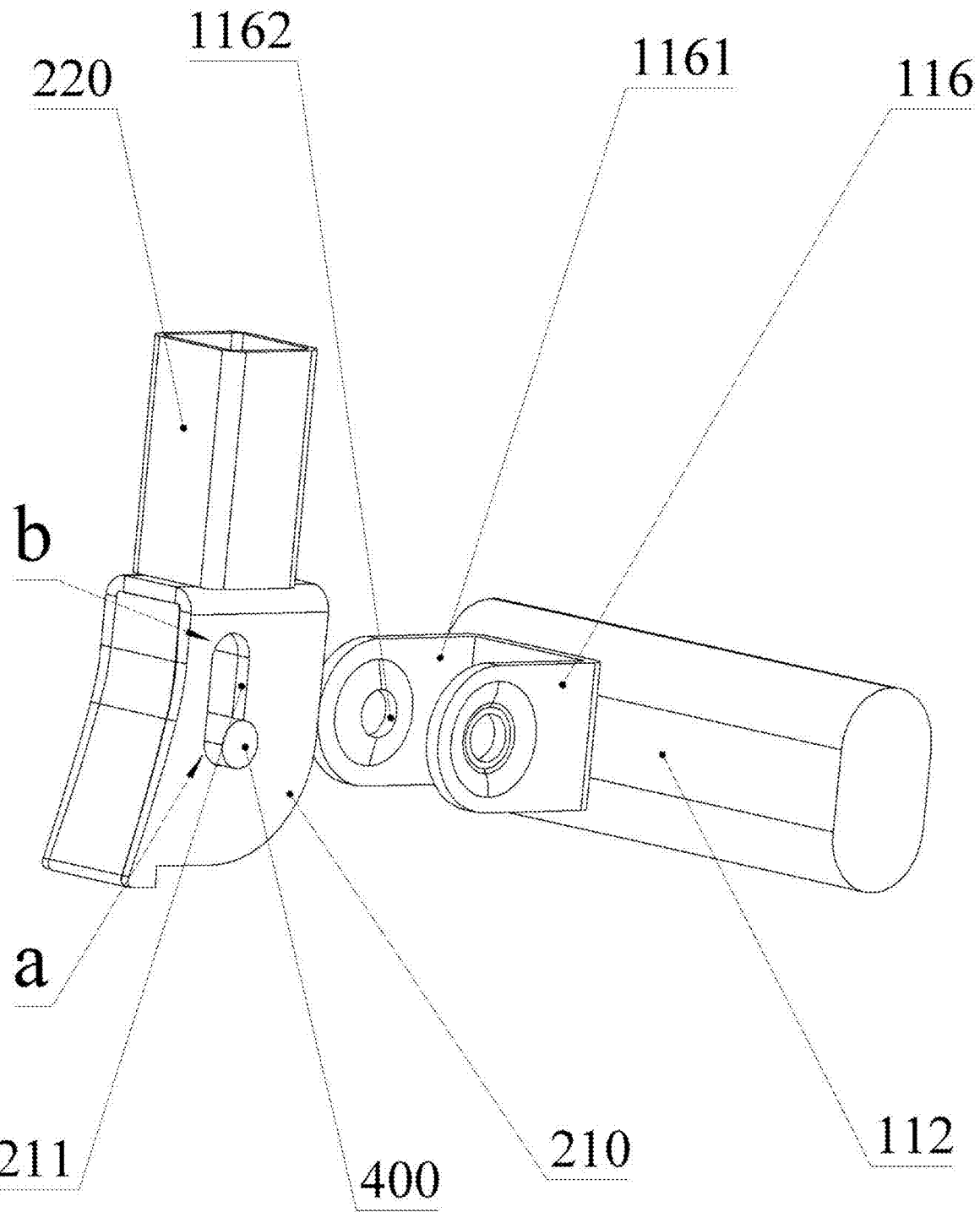
FIG. 9 is a schematic diagram of the connector and the connecting end in the embodiment shown in FIG. 8.
Figure 13:
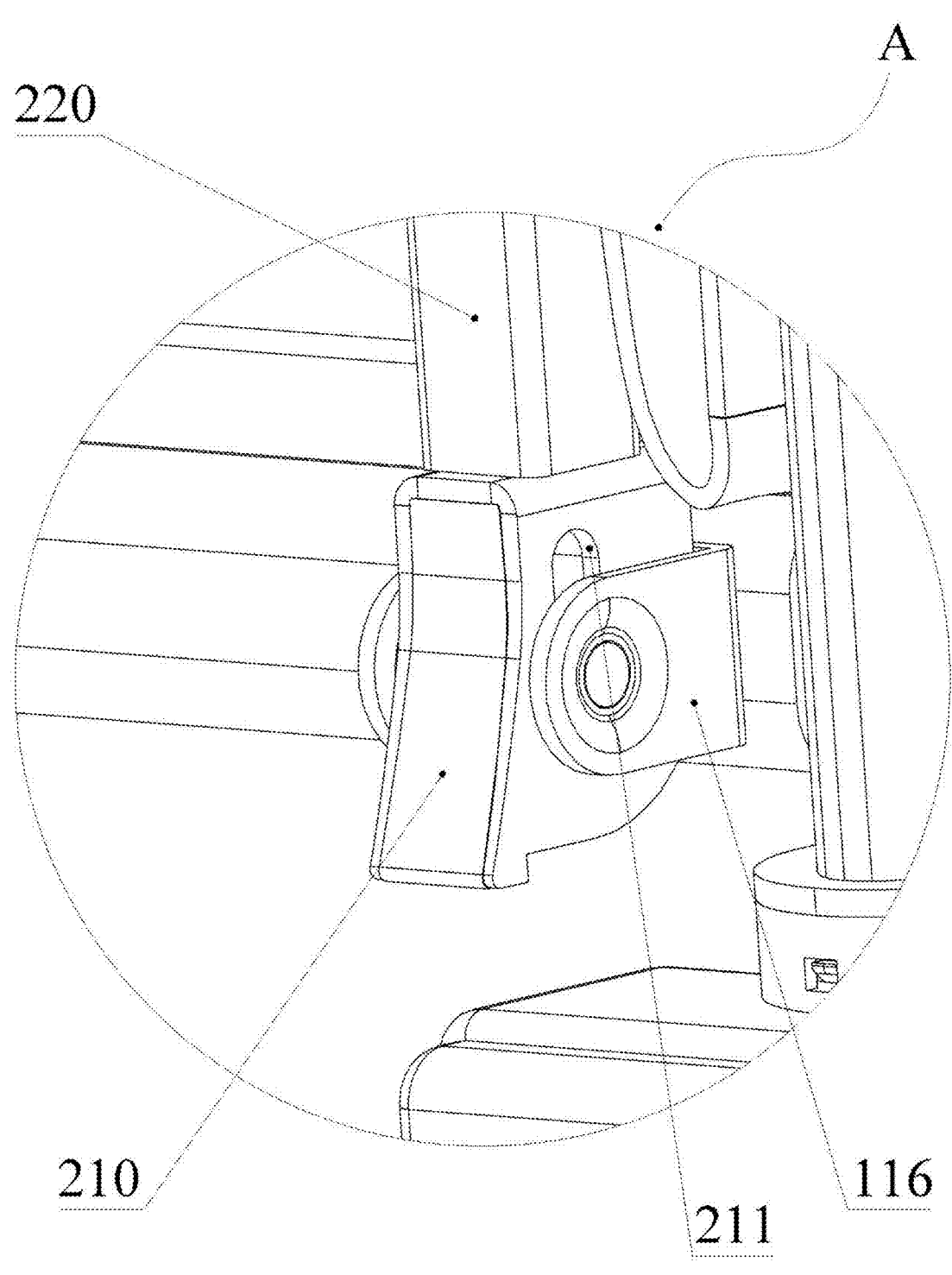
FIG. 13 is an enlarged schematic diagram of section A in the embodiment shown in FIG. 3.
Figure 14:
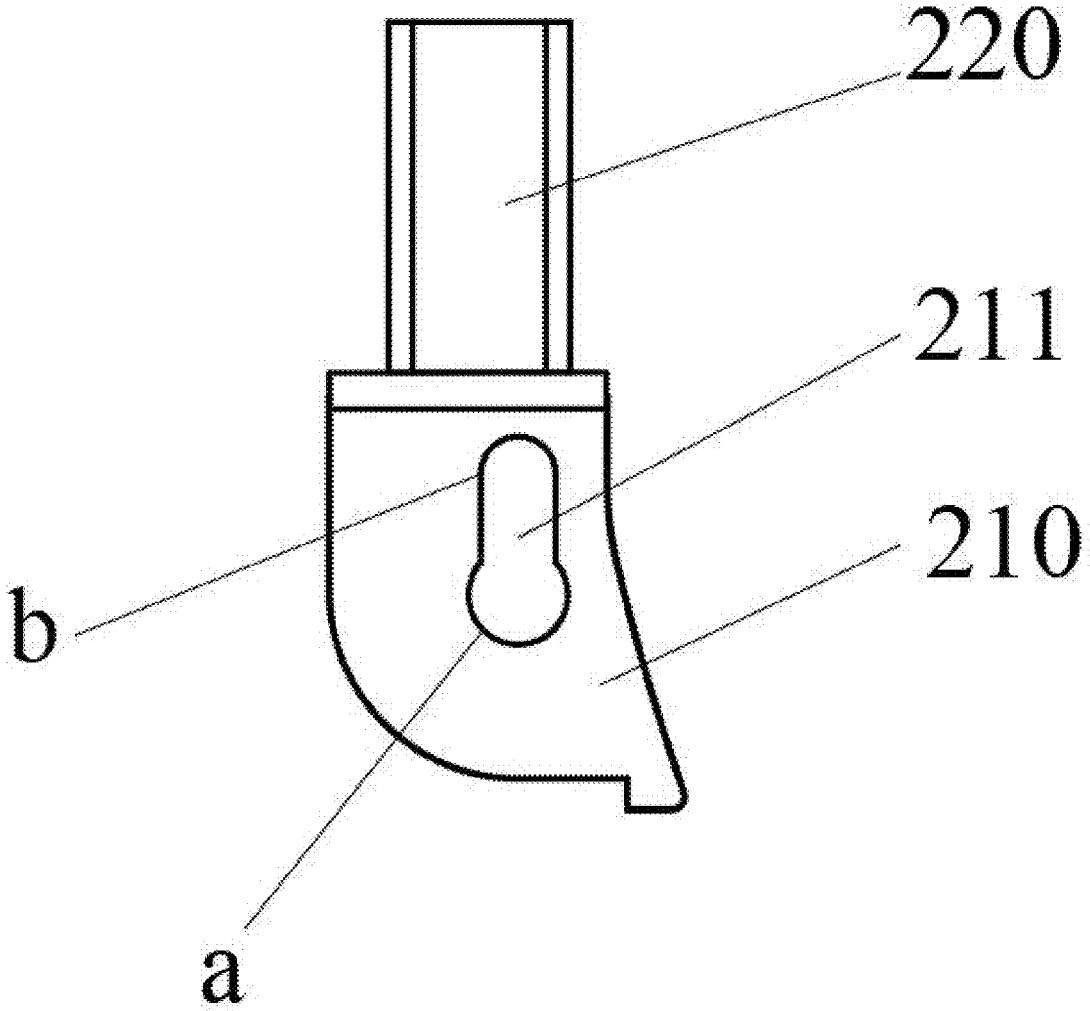
FIG. 14 is a schematic diagram of the oblong hole in the embodiment shown in FIG. 9.

In this embodiment, referring to FIGS. 9 and 13, the connecting end 210 of the extension plate 200 is provided with an oblong hole 211, and the tip of the connecting end 210 is in an outwardly extending arc shape. The horizontal rod 112 is fixedly equipped with a mounting base 116, which extends in the direction of the extension plate 200. A mounting slot 1161 is arranged at the middle of the mounting base 116, and the connecting end 210 of the extension plate 200 is located in the mounting slot 1161. Both sides of the mounting base 116 are provided with connecting holes 1162, and the two connecting holes 1162 are coaxially arranged. The connecting end 210 of the extension plate 200 is rotatably installed within the mounting slot 1161, and a connecting shaft 400 is inserted into the oblong hole 211. Both ends of the connecting shaft 400 are rotatably connected to the connecting holes 1162, and the connecting end 210 is connected with the connecting holes 1162 through the connecting shaft 400, thereby allowing the extension plate 200 to be rotatably connected to the mounting base 116. Referring to FIGS. 9 and 14, when the extension plate 200 rotates, the first end of the oblong hole 211 moves along the connecting shaft 400. When the extension plate 200 is rotated to the stored state, the extension plate 200 is capable of moving vertically within the mounting slot 1161 along the length of the oblong hole 211. When the second end of the oblong hole 211 approaches the connecting shaft 400, the sidewall of the connecting end 210 of the extension plate 200 abuts against the sidewall of the mounting base 116, keeping the extension plate 200 in the stored state. In short, when storing the extension plate 200, the user only needs to rotate the extension plate 200, allowing the extension plate 200 to move along the moving position of the oblong hole 211. When the user presses the extension plate 200 downward, the extension plate 200 snaps into the mounting slot 1161 because the sidewall of the mounting base 116 is engaged with the sidewall of the oblong hole 211, preventing the extension plate 200 from rotating. To unfold the extension plate 200, the user needs to lift the extension plate 200 upward, disengaging the sidewall of the mounting base 116 from the sidewall of the oblong hole 211. The tip of the connecting end 210 is configured as arc-shaped to facilitate rotation of the extension plate 200 within the mounting slot. When the extension plate 200 is in the stored state, the sidewall of the mounting base 116 can be engaged with the sidewall of the oblong hole 211; otherwise, the extension plate 200 cannot remain in the stored state. The beneficial effect of this structure is that the extension plate 200 can be kept in the stored state without disassembly, simplifying the design and enhancing user convenience.

In other embodiments (not shown), a strong magnet is installed at the bottom of the connecting end 210 of the extension plate 200, while a magnet is also placed at corresponding position on the mounting base 116 (or modified mounting base) of the horizontal rod 112. The structure of the mounting slot 1161 is optimized, with a quick-press snap or a toggle latch added to its edge. For storage, the extension plate 200 is aligned with the mounting slot 1161, and the magnet will automatically attract it for preliminary positioning. Then, pressing the extension plate 200 or toggling the latch will achieve secure locking when a "click" sound is produced. For unfolding, the user simply needs to release the snap or latch with one hand, and the magnetic force will cause the extension plate 200 to slightly pop up for easy lifting, after which it can be rotated to be unfolded. This entirely eliminates the need for aligning the connecting shaft 400 and the oblong hole 211.

Figure 11:
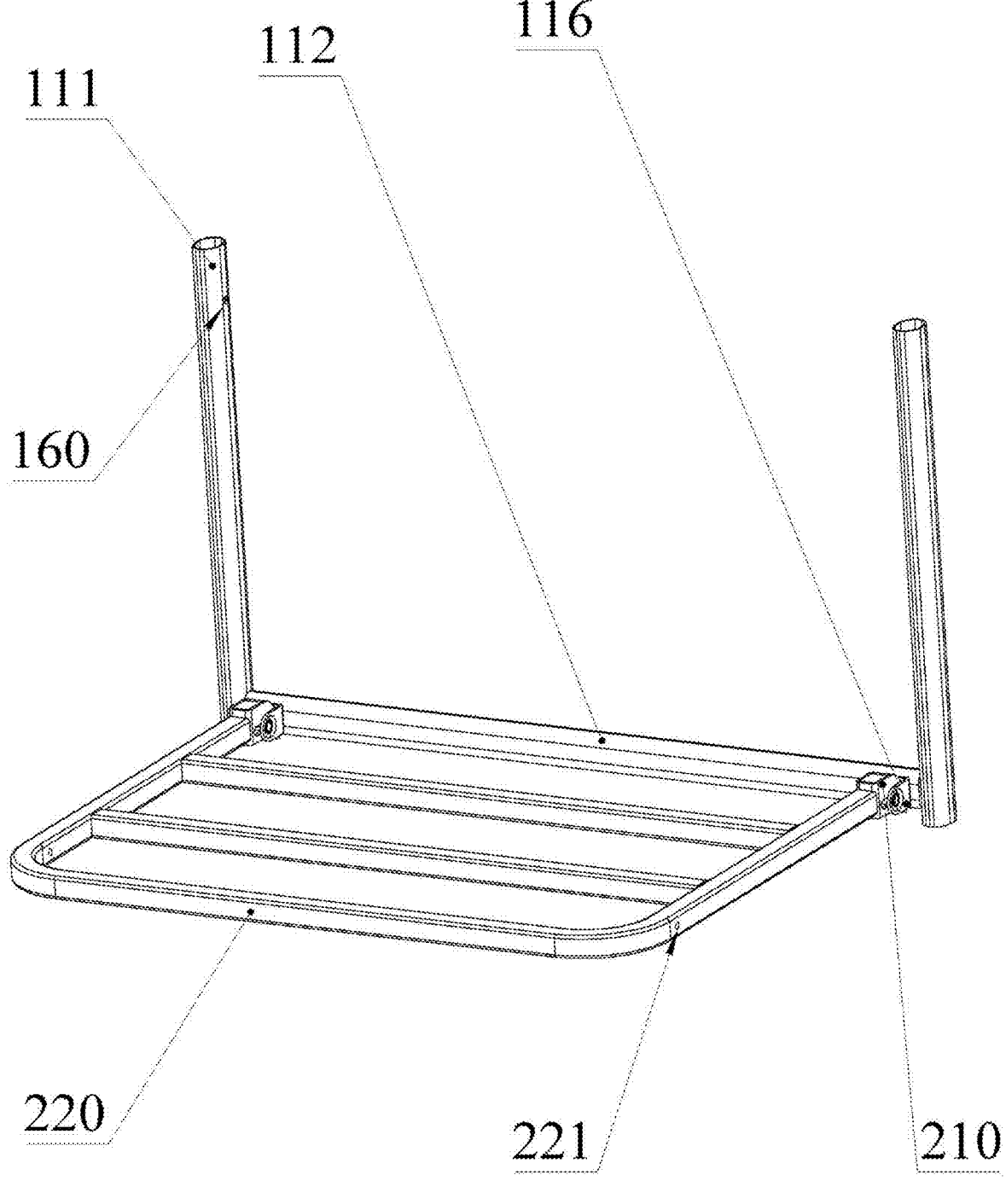
FIG. 11 is a schematic structural diagram of the extension plate and cart frame in the embodiment shown in FIG. 10.
Figure 12:
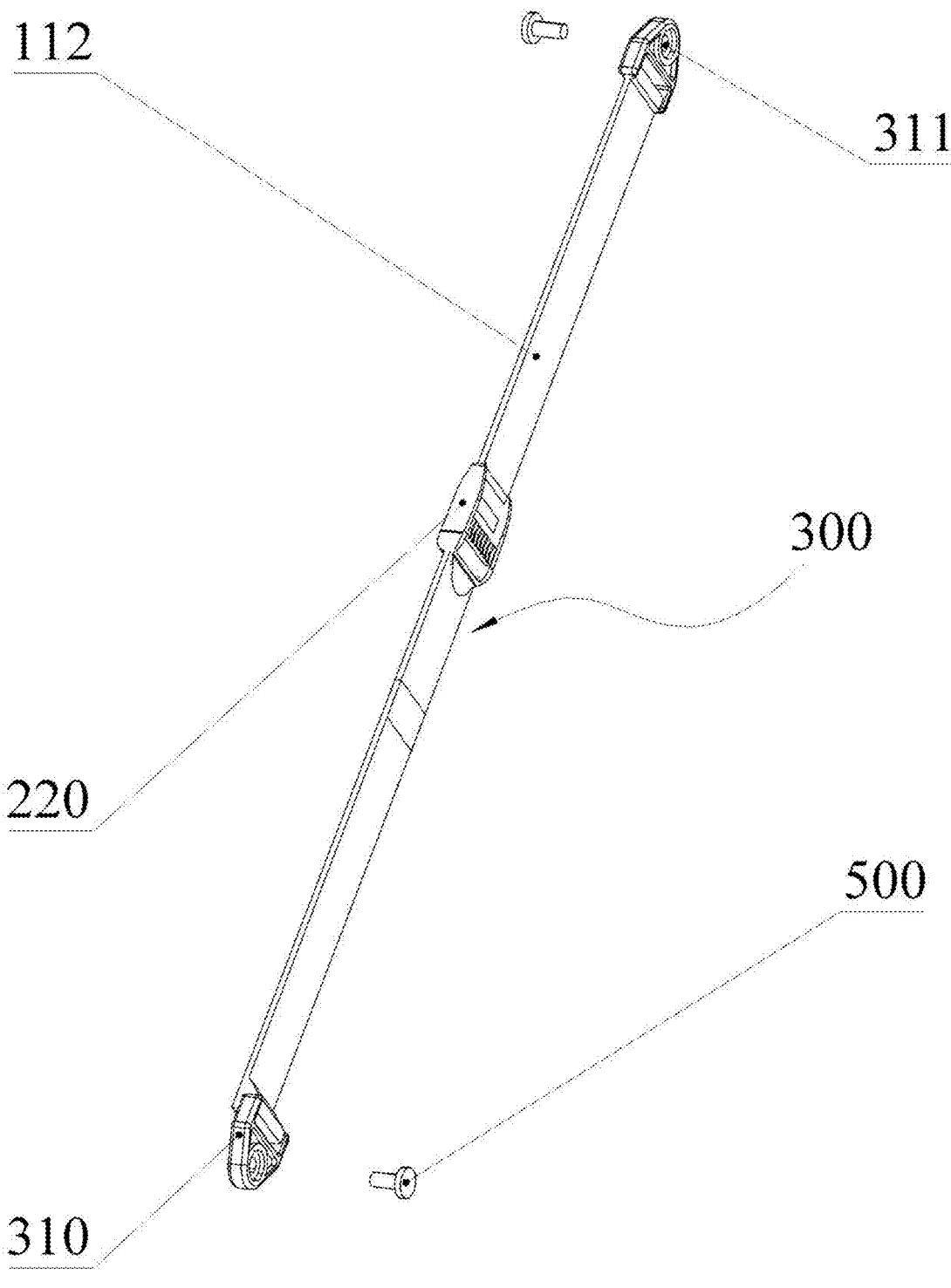
FIG. 12 is a schematic structural diagram of the tension assembly in the embodiment shown in FIG. 10.

In this embodiment, referring to FIG. 12, both the first end and the second end of the tension assembly 300 are equipped with connectors 310, each connector 310 featuring a first through-hole 311. As shown in FIG. 11, the extension end 220 of the extension plate 200 has a second through-hole 221, while the cart body 100 includes a third through-hole 160 positioned higher than the connection point between connecting end 210 of the extension plate 200 and the cart body 100. Referring to FIG. 12, the first through-hole 311 is detachably connected to the second through-hole 221 and the third through-hole 160 through a fastener 500, allowing the tension assembly 300 to be detachably connected to both the cart body 100 and the extension plate 200. The fastener 500 can also be detachably connected to the first through-hole 311, second through-hole 221, and third through-hole 160, facilitating the user to replace the tension assembly 300.

In other embodiments, the fastener 500 may be a pin, bolt, or other type of clip to secure the first through-hole 311, the second through-hole 221, and the third through-hole 160.

In other embodiments, referring to FIG. 12, the tension assembly 300 includes two non-elastic tensioning straps 320, with connectors 310 attached to both ends of the two tensioning straps 320. The tensioning straps 320 are equipped with length adjustment buckles 321, enabling users to adjust the length of the tensioning straps 320 when unfolding the extension plate.

In other embodiments (not shown), a coil spring or constant-force spring box is built into the second end of the tension assembly 300 (where it is connected to the vertical rod 111 of the cart body 100). In this case, the main body of the tension assembly 300 is a high-strength woven strap (similar to a safety belt), with one end fixed to the extension end 220 (the first end) of the extension plate 200 and the other end wound around the spool of the coil spring mechanism (the second end). When the user lifts and rotates the extension plate 200 to the horizontal position, the strap is pulled out, and the coil spring mechanism generates a constant retraction force, automatically tightening the strap to provide immediate support without the need for manual adjustment of the tensioning strap 320 or length adjustment buckle 321. When the user lifts the extension plate 200 to release the lock and begins to rotate it for storage, the coil spring mechanism automatically and smoothly retracts the strap back into the storage box, completely avoiding issues like strap tangling or the hassle of manual winding.

In other embodiments, the tension assembly 300 can be a rope, strap, or other flexible component. When a rope, strap, or other flexible component is used, the extension plate 200 can be wound or coiled for storage, reducing occupied space and volume. Additionally, the tension assembly 300 can also be a metal telescopic rod, which, due to its metal material, allows the tension assembly 300 to provide greater support force.

Figure 5:
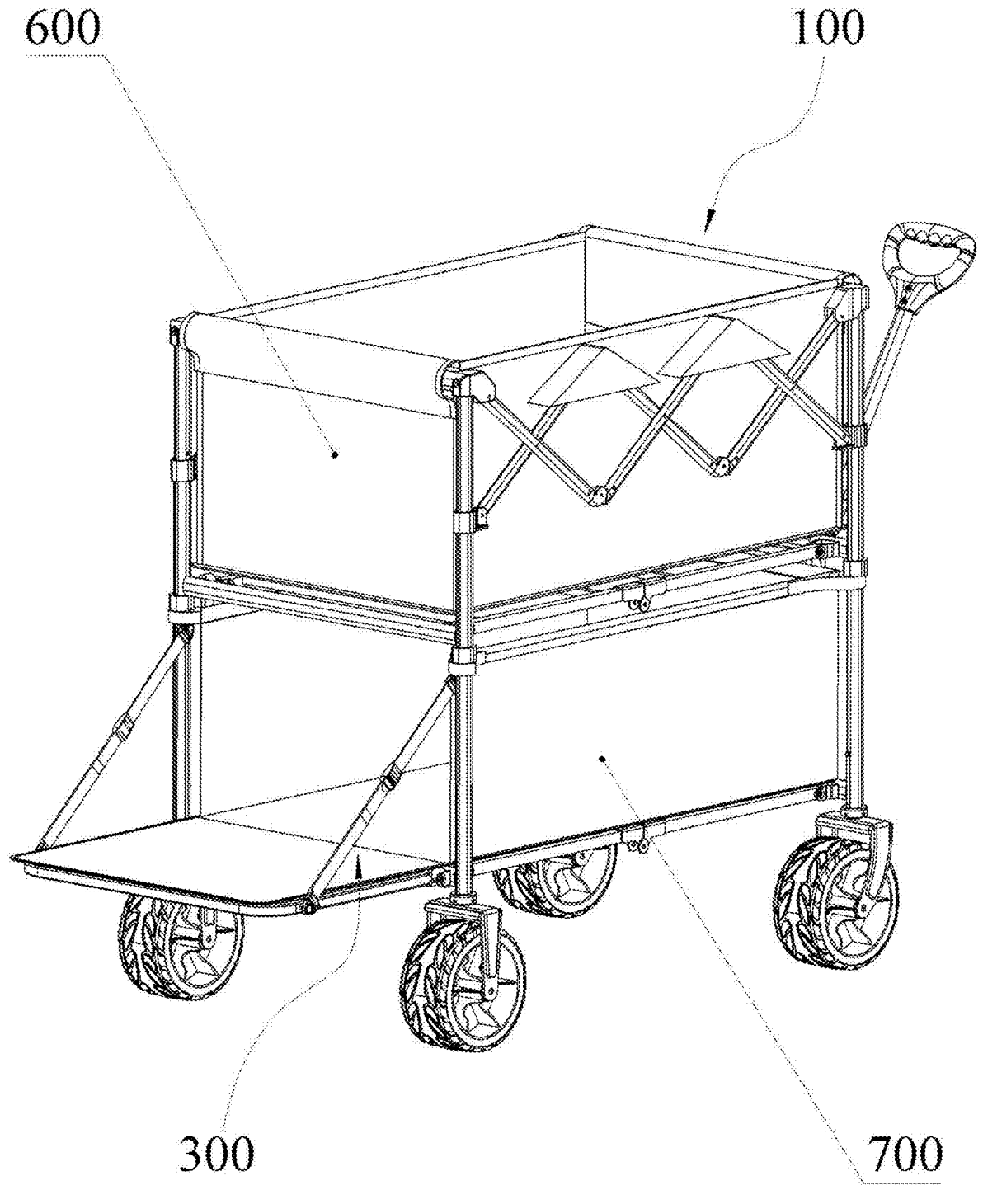
FIG. 5 is a schematic structural diagram of the storage pouch and the cart body in the embodiment shown in FIG. 2.

In this embodiment, referring to FIG. 5, the second load-bearing platform 130, the support rod 115, and the X-shaped telescopic frame 140 are configured to accommodate the first storage pouch 600. At the same time, the first load-bearing platform 120 and vertical rod 111 are configured to accommodate the second storage pouch 700. The side of the second storage pouch 700 facing the extension plate 200 is open, and its base extends onto the extension plate 200. By setting up the first storage pouch 600 and second storage pouch 700, it becomes convenient for users to place items.

Figure 6:
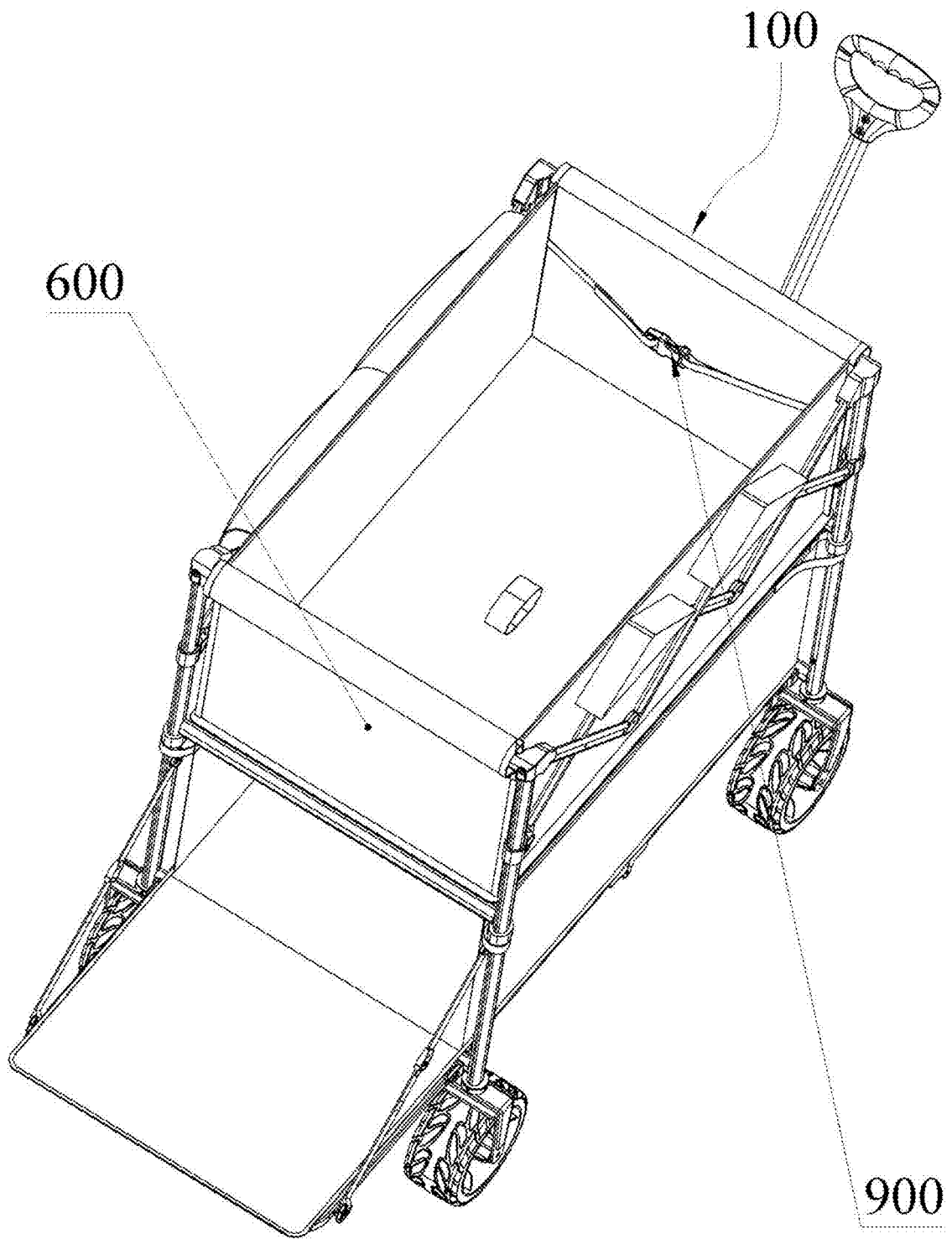
FIG. 6 is a schematic diagram of the internal structure of the storage pouch in the embodiment shown in FIG. 5.

In other embodiments, referring to FIG. 6, both the first storage pouch 600 and second storage pouch 700 are equipped with safety belts 800 inside, making it easier to secure items.

In other embodiments, both the first storage pouch 600 and second storage pouch 700 are made of thickened materials, allowing users to place children inside the pouches and secure them with the safety belts 800.

In other embodiments (not shown), a rigid PP or ABS plastic board (with ventilation holes) conforming to the back and hip curve of an infant is designed inside the storage pouch, with moderate edges for containment, making it easier to place children.

In summary, as can be seen from the above description, the present disclosure achieves the following technical effects: by using the tension assembly 300 to bear the gravity of the extension plate 200 when unfolded, the extension plate 200 can be directly unfolded for use or stored without the need of disassembling the tension assembly 300, making it simple, easy to use, and convenient to set up; moreover, through the arrangement of the oblong hole 211, the connecting end 210 of the extension plate 200, and the mounting base 116, the extension plate 200 can be maintained in the stored state without disassembly or assembly. The structural setup is simple and user-friendly.

In the description of the present disclosure, it should be appreciated that directional terms such as "front, rear, up, down, left, right", "horizontal, vertical, perpendicular, horizontal" and "top, bottom" etc. indicate the orientation or positional relationship based on the orientation or positional relationship shown in the drawings, and are only for the convenience of describing the present disclosure and simplifying the description. In the absence of a contrary explanation, these directional terms do not indicate or imply that the device or element referred to must have a specific orientation or be constructed and operated in a specific orientation, and therefore should not be understood as limiting the scope of protection of the present disclosure; the directional terms "inside, outside" refer to the inside and outside relative to the contour of each component itself.

For the convenience of description, spatial relative terms such as "on . . . ", "above . . . ", "on the upper surface of . . . ", "upper" etc. may be used here to describe the spatial positional relationship of a device or feature with other devices or features as shown in the drawings. It should be appreciated that spatial relative terms are intended to encompass different orientations of the device in use or operation other than the orientation described in the drawings. For example, if the device in the drawing is inverted, the device described as "above other devices or structures" or "on other devices or structures" will subsequently be positioned as "below other devices or structures" or "under other devices or structures". Thus, the exemplary term "above" can include both "above" and "below" orientations. The device can also be positioned in other different ways (rotated 90 degrees or in other orientations), and the spatial relative descriptions used here should be interpreted accordingly.

In addition, it should be noted that the use of terms such as "first", "second" etc. to define components is for the convenience of distinguishing the corresponding components. Unless otherwise stated, the above terms have no special meaning, and therefore should not be understood as limiting the scope of protection of the present disclosure.

The above description is only a preferred embodiment of the present disclosure and is not intended to limit the present disclosure. For those skilled in the art, the present disclosure can have various modifications and changes. Any modifications, equivalent replacements, improvements etc. made within the spirit and principles of the present disclosure should be included within the scope of protection of the present disclosure.

What is claimed is:

1. An expandable platform cart, comprising:
a first load-bearing platform and a second load-bearing platform;
a cart body and an extension plate, wherein
the extension plate has a connecting end and an extension end, and the connecting end of the extension plate is rotatably mounted to the cart body through a pivot connection structure, enabling the extension plate to switch between an unfolded state and a stored state; and
the pivot connection structure comprises:
an oblong hole arranged at the connecting end of the extension plate;
a mounting base fixed to the cart body and provided with a mounting slot and coaxially opposed connecting holes; and
a connecting shaft, which passes through the oblong hole and the connecting holes to operably mount the extension plate within the mounting slot along a length direction of the oblong hole;
wherein when the extension plate is in the stored state, the connecting end of the extension plate and the mounting base achieve abutment and engagement through displacement of the oblong hole relative to the connecting shaft;
wherein the cart body comprises two X-shaped telescopic frames, two cart frames each comprising two vertical rods and a horizontal rod connected between the two vertical rods;
wherein a top portion of each of the two vertical rods of each of the two cart frames is movably sleeved with a respective fixing sleeve and each of the respective fixing sleeves is movably sleeved with a respective support rod;
wherein the X-shaped telescopic frames and the second load-bearing platform are mounted on the support rods, and the cart body is configured as a double-tier cart; by removing the fixing sleeves and the support rods and mounting the X-shaped telescopic frames on the vertical rods, the cart body is configured as a single-tier cart.

2. The expandable platform cart according to claim 1, wherein the connecting end of the extension plate is rotatably mounted to the mounting slot; and
both ends of the connecting shaft are rotatably connected to the connecting holes, and the connecting end is connected to the connecting holes through the connecting shaft, enabling the extension plate to be rotatably connected to a second connector; and
wherein when the extension plate rotates, a first end of the oblong hole moves along the connecting shaft; when the extension plate rotates to the stored state, the extension plate is capable of moving vertically within the mounting slot along the length direction of the oblong hole, and when a second end of the oblong hole approaches the connecting shaft, a sidewall of the connecting end abuts against a sidewall of the second connector to maintain the extension plate in the stored state.

3. The expandable platform cart according to claim 2, wherein an end of the connecting end is in an outwardly extending arc shape.

4. The expandable platform cart according to claim 1, further comprising a tension assembly, wherein one end of the tension assembly is connected to the extension end of the extension plate, a second end of the tension assembly is connected to the cart body, and a connection point between the second end of the tension assembly and the cart body is higher than a connection point between the connecting end of the extension plate and the cart body, such that when the extension plate is unfolded, the tension assembly is capable of tensioning the extension end of the extension plate.

5. The expandable platform cart according to claim 4, wherein each of the one end and the second end of the tension assembly is provided with a connector, on which a first through-hole is arranged; a second through-hole is arranged on the extension end of the extension plate, and a third through-hole is arranged on the cart body, wherein the third through-hole is higher than the connection point between the connecting end of the extension plate and the cart body, and the first through-hole is detachably connected to the second through-hole and the third through-hole through fasteners, enabling the tension assembly to be detachably connected to the cart body and the extension plate.

6. The expandable platform cart according to claim 5, wherein the tension assembly comprises two tensioning straps, and the connectors are arranged at both ends of the two tensioning straps.

7. The expandable platform cart according to claim 6, wherein the tensioning straps are equipped with length adjustment buckles.

8. The expandable platform cart according to claim 4, wherein the two cart frames are connected through the first load-bearing platform.

9. The expandable platform cart according to claim 8, wherein a second load-bearing platform is arranged between the two cart frames, the second load-bearing platform is positioned above the first load-bearing platform, and the second load-bearing platform has a structure identical to that of the first load-bearing platform.

10. The expandable platform cart according to claim 8, wherein for each cart frame the horizontal rod is fixedly installed between the two vertical rods, and both of the two vertical rods are equipped with casters; and the connecting end and the mounting base are both located on the horizontal rod of one of the two cart frames; and an end of the tension assembly away from the extension plate is connected to the vertical rod of the one of the two cart frames.

11. The expandable platform cart according to claim 10, wherein the first load-bearing platform comprises two mutually hinged fixing rods, both of which are hinged to corresponding ones of the horizontal rods.

\*　\*　\*　\*　\*